United States Patent
Chen et al.

(10) Patent No.: US 10,600,190 B2
(45) Date of Patent: Mar. 24, 2020

(54) OBJECT DETECTION AND TRACKING METHOD AND SYSTEM FOR A VIDEO

(71) Applicant: Institute For Information Industry, Taipei (TW)

(72) Inventors: Bo-Chih Chen, Kaohsiung (TW); Ching-Wen Lin, New Taipei (TW)

(73) Assignee: Institute For Information Industry, Taipei (TW)

( * ) Notice: Subject to any disclaimer, the term of this patent is extended or adjusted under 35 U.S.C. 154(b) by 155 days.

(21) Appl. No.: 15/822,037

(22) Filed: Nov. 24, 2017

(65) Prior Publication Data

US 2019/0122372 A1 Apr. 25, 2019

(30) Foreign Application Priority Data

Oct. 25, 2017 (TW) .............................. 106136714 A

(51) Int. Cl.
*G06T 7/246* (2017.01)
*G06T 7/238* (2017.01)
*G06K 9/62* (2006.01)

(52) U.S. Cl.
CPC .............. *G06T 7/248* (2017.01); *G06T 7/238* (2017.01); *G06K 9/6215* (2013.01); *G06T 2207/10016* (2013.01)

(58) Field of Classification Search
None
See application file for complete search history.

(56) References Cited

U.S. PATENT DOCUMENTS

| 2013/0272570 | A1* | 10/2013 | Sheng | ..................... | G06F 3/017 |
| | | | | | 382/103 |
| 2014/0010456 | A1* | 1/2014 | Merler | ..................... | G06K 9/64 |
| | | | | | 382/191 |
| 2019/0122372 | A1* | 4/2019 | Chen | ..................... | G06T 7/248 |

OTHER PUBLICATIONS

Ramaravind et al. Scale Adaptive Object Tracker with Occlusion Handling, I.J. Image, Graphics and Signal Processing, 2016, 1, 27-35, Published Online Jan. 2016 in MECS (http://www.mecs-press.org/), DOI: 10.5815/ijigsp.2016.01.03 (Year: 2019).*

* cited by examiner

*Primary Examiner* — Tahmina N Ansari
(74) *Attorney, Agent, or Firm* — Skaar Ulbrich Macari, P.A.

(57) ABSTRACT

An object detection and tracking method and system are provided. The object detection and tracking method includes the following steps: (i) selecting one of a plurality of frames of a video as a current frame, (ii) searching in an object tracker searching area of the current frame to generate a current object tracker, (iii) searching in each auxiliary tracker searching area of the current frame to individually generate a current auxiliary tracker, (iv) when the current object tracker is located at a block different from the blocks located by the generated object trackers, generating a new auxiliary tracker at the central position of the current frame, and (v) repeating the above steps until all the frames have been processed.

10 Claims, 6 Drawing Sheets

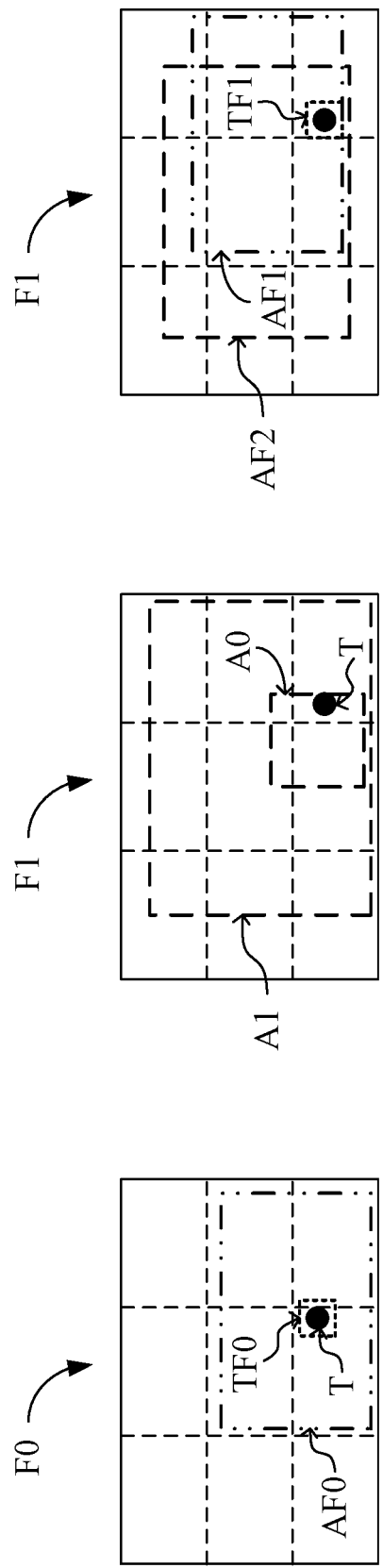

OBJECT DETECTION AND TRACKING METHOD AND SYSTEM FOR A VIDEO

PRIORITY

This application claims priority to Taiwan Patent Application No. 106136714 filed on Oct. 25, 2017, which is hereby incorporated by reference in its entirety.

FIELD

The present invention relates to an object detection and tracking method and system. Particularly, the present invention relates to an object detection and tracking method and system for a video.

BACKGROUND

With the rapid development of image processing technologies in recent years, automatic image tracking technologies have also become sophisticated. However, the accuracy of tracking an object in a video still need be improved. For example, the pre-existing tracking algorithms usually have a specific searching range, so when an object in a video moves by an excessive displacement amount or at a very fast speed, it is likely that the object will disappear from the frame or temporarily disappear from and then comes back to the frame. As a consequence, the tracked object goes beyond the specific searching range of the tracking algorithms to make it impossible to accomplish tracking of the object. Additionally, when there are objects similar to the tracked object in the video, the current tracking technologies often fail to distinguish between them, thus leading to false tracking results.

Accordingly, there is an urgent need in the art for a technology that can accurately identify and track an object without consuming a lot of computing resources so as to avoid the problem that the object going beyond the specific searching range cannot be tracked and avoid the shortcoming that false tracking results may be caused due to objects similar to the tracked object.

SUMMARY

The disclosure includes an object detection and tracking method adapted for an electronic computing apparatus. A video comprises a plurality of frames, the frames have a same coordinate range, and the coordinate range is defined into a plurality of blocks. The object detection and tracking method comprises the following steps: (a) selecting one of the frames as a current frame, wherein a previous frame of the current frame has a previous object tracker and at least one previous auxiliary tracker, each of the at least one previous auxiliary tracker individually has a first relative position relative to a generated object tracker, the previous object tracker is located in one of the blocks and is one of the at least one generated object tracker, and each of the at least one generated object tracker is located in one of the blocks; (b) searching in an object tracker searching area of the current frame to generate a current object tracker, wherein the object tracker searching area is defined by the previous object tracker, and the current object tracker is located in one of the blocks; (c) searching in each of at least one auxiliary tracker searching area of the current frame to individually generate a current auxiliary tracker, wherein each of the at least one auxiliary tracker searching area is defined by one of the at least one previous auxiliary tracker; (d) when the block where the current object tracker is located is different from the blocks where each of the at least one generated object tracker is located, generating a new auxiliary tracker at a central position of the current frame, the current object tracker having a second relative position relative to the new auxiliary tracker; and (e) repeating the steps (a) to (d) by taking the current frame as the previous frame, the current object tracker as the previous object tracker, and the at least one current auxiliary tracker and the new auxiliary tracker as the at least one previous auxiliary tracker.

The disclosure also includes an object detection and tracking system. A video comprises a plurality of frames, the frames have a same coordinate range, and the coordinate range is defined into a plurality of blocks. The object detection and tracking system comprises a processor and a recording element electrically connected with each other. The processor is configured to execute the following steps: (a) selecting one of the frames as a current frame, wherein a previous frame of the current frame has a previous object tracker and at least one previous auxiliary tracker, each of the at least one previous auxiliary tracker individually has a first relative position relative to a generated object tracker, the previous object tracker is located in one of the blocks and is one of the at least one generated object tracker, and each of the at least one generated object tracker is located in one of the blocks; (b) searching in an object tracker searching area of the current frame to generate a current object tracker, wherein the object tracker searching area is defined by the previous object tracker, and the current object tracker is located in one of the blocks; (c) searching in each of at least one auxiliary tracker searching area of the current frame to individually generate a current auxiliary tracker, wherein each of the at least one auxiliary tracker searching area is defined by one of the at least one previous auxiliary tracker; (d) when the block where the current object tracker is located is different from the blocks where each of the at least one generated object tracker is located, generating a new auxiliary tracker at a central position of the current frame, the current object tracker having a second relative position relative to the new auxiliary tracker; and (e) repeating the steps (a) to (d) by taking the current frame as the previous frame, the current object tracker as the previous object tracker, and the at least one current auxiliary tracker and the new auxiliary tracker as the at least one previous auxiliary tracker. The recording element is configured to store the previous object tracker, the at least one previous auxiliary tracker, the current object tracker, the at least one current auxiliary tracker, the new auxiliary tracker, the at least one first relative position and the second relative position.

By using at least one auxiliary tracker generated in each frame and a recorded relative position between each of the at least one auxiliary tracker and a corresponding generated object tracker and by designing the size of each of the at least one auxiliary tracker to be at least a half of the size of each frame, the object detection and tracking technology (including the object detection and tracking method and system) of the present invention solves the problem that the tracking algorithm may fail to accomplish the tracking due to the restricted specific searching range. Then when an object goes beyond the specific searching range of the tracking algorithm, the object detection and tracking technology of the present invention can obtain the position of the object tracker according to the at least one relative position described above.

The object detection and tracking technology of the present invention defines a coordinate range of the frames included in a video into a plurality of blocks. The object detection and tracking technology of the present invention determines whether to generate a new auxiliary tracker according to generation records of auxiliary trackers of each block recorded in the recording element. Specifically, if no auxiliary tracker has been generated for a block where the current object tracker is located, then the technology of the present invention generates a new auxiliary tracker at a central position of the frame and records the current object tracker, the new auxiliary tracker and a relative position therebetween as a reference for use when the object tracker is lost in the subsequent image tracking process. The object detection and tracking technology of the present invention generates a corresponding new auxiliary tracker only when the current tracker is generated the first time in a block, so waste of computing resources caused by repeatedly generating auxiliary trackers for a same block can be avoided.

Furthermore, the object detection and tracking technology of the present invention tracks an object tracker and all auxiliary trackers with a tracking algorithm, calculates a similarity value between object trackers in two frames to ensure accuracy of the current object tracker tracked in the current frame, and calculates a similarity value between corresponding auxiliary trackers in two frames to ensure accuracy of the auxiliary tracker tracked in the current frame. The object detection and tracking technology of the present invention records correct auxiliary trackers as a reference for use when the object tracker is lost in the subsequent image tracking process, and solves the problem that the tracking algorithm might fail to distinguish between similar objects. Thereby, the present invention provides a tracking technology that can search in a large range and identify objects in a video to optimize the tracking result in low-performance requirement environments.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1B depicts an exemplary example where a coordinate range of the frames included in a video is defined into a plurality of blocks;

FIG. 1C depicts how the object detection and tracking method tracks an object T in a frame F0 and a frame F1;

DETAILED DESCRIPTION

In the following description, the object detection and tracking method and system for a video will be explained with reference to certain example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the present invention.

It should be appreciated that, in the following embodiments and the attached drawings, elements unrelated to the present invention are omitted from depiction; and dimensions of individual elements and dimensional scales between the individual elements are shown only for illustration but not to limit the scope of the present invention.

Figure 1A:
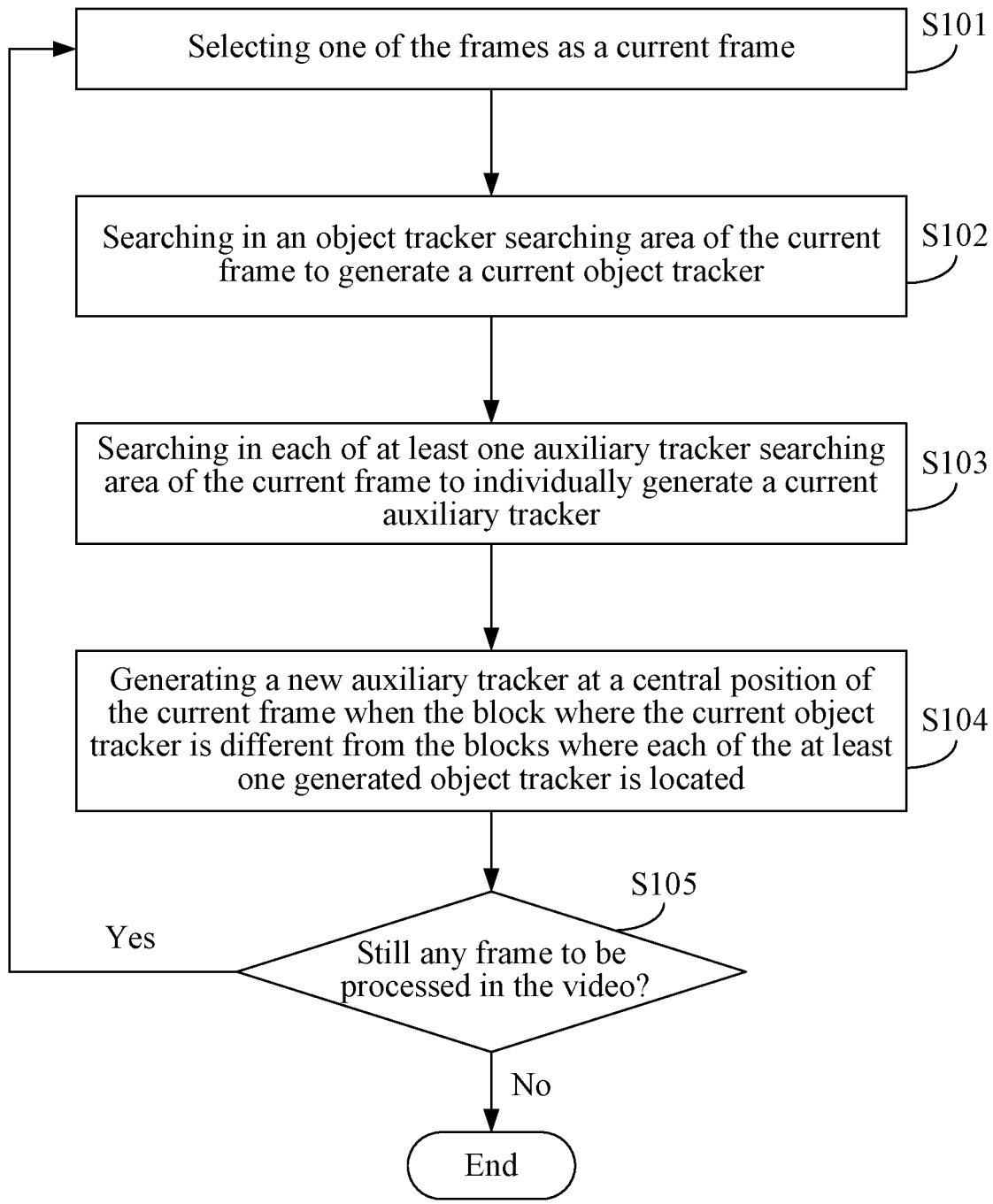
FIG. 1A depicts a flowchart diagram of an object detection and tracking method according to a first embodiment.

A first embodiment of the present invention is an object detection and tracking method, and a flowchart diagram of which is depicted in FIG. 1A. The object detection and tracking method is adapted for an electronic computing apparatus (e.g., an object detection and tracking system 300 to be described in the third embodiment). The object detection and tracking method can detect and track an object in a video. In this embodiment, the video comprises a plurality of frames having a time sequence, the frames have a same coordinate range, and the coordinate range is defined into a plurality of blocks. Please refer to an exemplary example depicted in FIG. 1B, where the coordinate range is defined into nine blocks of the same size B1, . . . , B9. For ease of understanding, the subsequent description will be made with reference to the definition depicted in FIG. 1B, but this definition is not intended to limit the scope of the present invention.

Please refer to FIG. 1C, which depicts how the object detection and tracking method tracks an object T in a frame F0 and a frame F1. It is hereby assumed that F0 is the first frame to be processed by the object detection and tracking method, so the object detection and tracking method may now execute an initialization process. Specifically, the object detection and tracking method determines an object T to be tracked (e.g., the user selects an object T in the frame F0, or an object detection technology detects an object satisfying a specific condition as the object T). After the object T to be tracked is determined, the object detection and tracking method executes a step (not shown) to generate an object tracker TF0 that encircles the object T. In the exemplary example depicted in FIG. 1C, the object tracker TF0 is located in the block B8. The object detection and tracking method further executes a step (not shown) to generate an auxiliary tracker AF0, which may have a size at least a half of that of the frame F0. Additionally, the object detection and tracking method may further execute a step (not shown) to record the following information: (a) the object tracker TF0, (b) the auxiliary tracker AF0, (c) a relative position between the auxiliary tracker AF0 and the object tracker TF0 (e.g., the object tracker TF0 is located at which position in the auxiliary tracker AF0), and (d) the auxiliary tracker AF0 is generated when the object tracker TF0 is located in the block B8.

Next in step S101, the electronic computing apparatus selects one of the frames of the video as a current frame. A previous frame of the current frame has a previous object tracker and at least one previous auxiliary tracker, and each of the at least one previous auxiliary tracker individually has a first relative position relative to a generated object tracker. For ease of understanding, description will be made with reference to the exemplary example of FIG. 1C, but this exemplary example is not intended to limit the scope of the present invention. In this exemplary example, the step S101 selects the frame F1, which is later than the frame F0 in time sequence, as the current frame. For example, if the frame F1 is a $t^{th}$ frame in the video, the frame F0 may be a $(t-1)^{th}$ or $(t-n)^{th}$ frame in the video, where the parameter t and the parameter n are positive integers. In this exemplary example, the current frame is the frame F1, and the previous frame is the frame F0, the previous object tracker is the object tracker TF0, the previous auxiliary tracker is the auxiliary tracker TF0, and the auxiliary tracker AF0 has a relative position relative to a generated object tracker (i.e., the object tracker TF0).

In this embodiment, the electronic computing apparatus searches in an object tracker searching area of the current frame to generate a current object tracker in step S102. It shall be appreciated that, the object tracker searching area is defined by the previous object tracker, and the size/coordinate of the object tracker searching area is located between the size/coordinate of the current frame and the size/coordinate of the previous object tracker. Additionally, the current object tracker generated in the step S102 is located in one of the blocks. For ease of understanding, the subsequent description will be made with reference to the exemplary example of FIG. 1C. The step S102 determines an object tracker searching area A0 according to the previous object tracker TF0, and finds in the object tracker searching area A0 an area corresponding to the previous object tracker TF0 as the current object tracker TF1. In the exemplary example of FIG. 1C, the current object tracker TF1 is located in the block B9.

In step S103, the electronic computing apparatus searches in each of at least one auxiliary tracker searching area of the current frame to individually generate a current auxiliary tracker. It shall be appreciated that, each of the at least one auxiliary tracker searching area is defined by one of the at least one previous auxiliary tracker, and the size/coordinate of each of the at least one auxiliary tracker searching area is located between the size/coordinate of the current frame and the size/coordinate of the corresponding previous auxiliary tracker. For ease of understanding, the subsequent description will be made with reference to the exemplary example of FIG. 1C. The step S103 determines the auxiliary tracker searching area A1 according to the previous auxiliary tracker AF0 and finds in the auxiliary tracker searching area A1 an area corresponding to the previous auxiliary tracker AF0 as the current auxiliary tracker AF1.

In this embodiment, when the block where the current object tracker is located is different from the blocks where each of the at least one generated object tracker is located, the electronic computing apparatus generates a new auxiliary tracker at a central position of the current frame in step S104, where the current object tracker has a relative position relative to the new auxiliary tracker. For ease of understanding, the subsequent description will be made with reference to the exemplary example of FIG. 1C. In this exemplary example, the block B9 where the current object tracker TF1 is located is different from the block B8 where the generated object tracker (i.e., the previous object tracker TF0) is located, so a new auxiliary tracker AF2 is generated at the central position of the current frame F1 in the step S104, where the size of the new auxiliary tracker AF2 may be at least a half of that of the frame F1. This new auxiliary tracker AF2 and the current object tracker TF1 have a relative position therebetween (e.g., the current object tracker TF1 is located at which position in the new auxiliary tracker AF2). The object detection and tracking method executes a step (not shown) to record the following information: (a) the current object tracker TF1, (b) the new auxiliary tracker AF2, (c) the relative position between the new auxiliary tracker AF2 and the current object tracker TF1, and (d) the new auxiliary tracker AF2 is generated when the current object tracker TF1 is located in the block B9.

Then in step S105, the electronic computing apparatus determines whether there is a next frame to be processed. If the determination result of the step S105 is "No", the object detection and tracking method is finished. Otherwise, if the determination result of the step S105 is "Yes", the steps S101 to S105 will be repeated by taking the current frame as the previous frame, the current object tracker as the previous object tracker, and the at least one current auxiliary tracker and the new auxiliary tracker as the at least one previous auxiliary tracker.

Figure 1D:
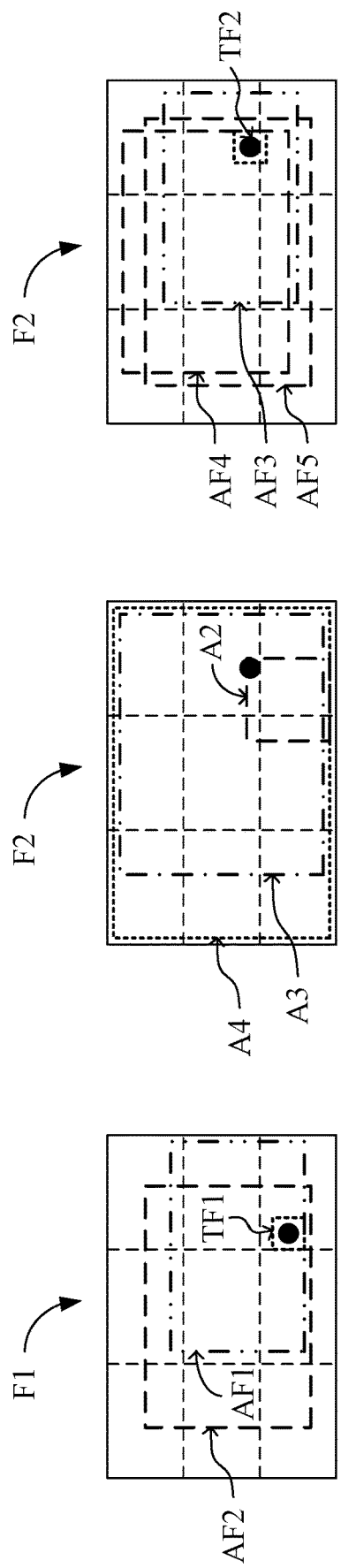
FIG. 1D depicts how the object detection and tracking method tracks an object T in the frame F1 and a frame F2.

For ease of understanding, it is hereby assumed that the determination result of the step S105 is "Yes", and description will be made with reference to an exemplary example depicted in FIG. 1D. FIG. 1D depicts how the object detection and tracking method tracks the object T in the frame F1 and the frame F2. In this exemplary example, the object detection and tracking method repeats the steps S101 to S105 by taking the frame F1 as the previous frame, the object tracker TF1 as the previous object tracker, and the current auxiliary tracker AF1 and the new auxiliary tracker AF2 as the at least previous auxiliary tracker.

In this exemplary example, the step S101 selects the frame F2, which is later than the frame F1 in time sequence, as the current frame. Then in the step S102, the electronic computing apparatus searches in an object tracker searching area A2 of the current frame F2 to generate a current object tracker TF2, where the current object tracker TF2 is located in the block B6. In the step S103, the electronic computing apparatus defines auxiliary tracker searching areas A3, A4 according to the previous auxiliary trackers AF1, AF2 respectively, and searches in the auxiliary tracker searching areas A3, A4 to generate current auxiliary trackers AF3, AF4 respectively.

Additionally, because the block B6 where the current object tracker TF2 is located is different from the blocks B8, B9 where the generated object trackers TF0, TF1 are located, a new auxiliary tracker AF5 is generated at the central position of the current frame F2 in the step S104, where the size of the new auxiliary tracker AF5 may be at least a half of the size of the frame F2. The new auxiliary tracker AF5 and the current object tracker TF2 have a relative position (e.g., the current object tracker TF2 is located at which position in the new auxiliary tracker AF5) therebetween. The object detection and tracking method executes a step (not shown) to record the following information: (a) the current object tracker TF2, (b) the new auxiliary tracker AF5, (c) the relative position between the new auxiliary tracker AF5 and the current object tracker TF2, and (d) the new auxiliary tracker AF5 is generated when the current object tracker TF1 is located in the block B9.

Afterwards, it is determined again in step S105 whether there is still any frame to be processed in the video. The object detection and tracking method may repeat the aforesaid steps S101 to S105 until there is no frame to be processed.

It shall be appreciated that, in this embodiment, the step S102 and the step S103 perform the searching with a tracking algorithm, and the object tracker searching area and the auxiliary tracker searching areas may be determined by the tracking algorithm. The tracking algorithm may be a Kernelized Correlation Filter (KCF) algorithm, a Continuous Adaptive Meanshift algorithm, a Kalman Filter algorithm, a Particle Filter algorithm, a Staple algorithm (please see the article "Staple: Complementary Learners for Real-Time Tracking" published in Conference on Computer Vision and Pattern Recognition), a Discriminative Correlation Filter (DCF) algorithm, or an Optical Flow algorithm, although it is not limited thereto.

As described above, in this embodiment, the size of each auxiliary tracker generated in the step S103 may be at least a half of the size of each frame. For example, the size of the auxiliary tracker AF0 may be at least a half of the size of the frame F0, the size of the auxiliary tracker AF2 may be at least a half of the size of the frame F1, and the size of the auxiliary tracker AF5 may be at least a half of the size of the frame F2. Through generation and tracking of the auxiliary trackers, the range restriction presented when an object tracker is searched by the tracking algorithm can get improved to widen the trackable range.

Additionally in this embodiment, whether a new auxiliary tracker is generated for the current frame (e.g., whether the new auxiliary trackers AF2, AF5 are generated for the frames F1, F2 respectively) in the step S104 depends on whether an auxiliary tracker has been generated for the block where the current object tracker is located. The block where the current object tracker is located being different from the block where a generated object tracker is located means that no new auxiliary tracker has been generated for the block where the current object tracker is located, so a new auxiliary tracker is generated in the step S104. On the other hand, the block where the current object tracker is located being the same as the block where a generated object tracker is located means that a new auxiliary tracker has been generated for the block where the current object tracker is located, so the step S104 will not generate a new auxiliary tracker. Specifically, when the current frame is the frame F1, the block B9 where the current object tracker TF1 is located is different from the block where the generated object tracker is located (i.e., the block B8 where the object tracker TF0 is located) and this means that an auxiliary tracker (i.e., the auxiliary tracker AF0) has been generated only for the block B8, so the new auxiliary tracker AF2 will be generated in the step S104. Likewise, when the current frame is the frame F2, the block B6 where the current object tracker TF2 is located is different from the block where the generated object tracker is located (i.e., the block B8 where the object tracker TF0 is located and the block B9 where the object tracker TF1 is located), so the new auxiliary tracker AF5 will be generated in the step S104. As can be known from the above descriptions, ever presence of an object tracker in one of the blocks B1 to B9 in any processed frames means that there is already a generation record of the corresponding auxiliary tracker, so no new auxiliary tracker will be generated. In other words, generation of a new auxiliary tracker occurs only when an object tracker appears the first time in a block.

What shall be additionally described is how to determine a block where an object tracker is located. When an object tracker spans across different blocks, one of the blocks having the greatest area covered by the object tracker is taken as the block where the object tracker is located. For example, because the object tracker TF0 spans across the block B8 and the block B9 and an area of the block B8 that is covered by the object tracker TF0 is greater than an area of the block B9 that is covered by the object tracker TF0, the object tracker TF0 is considered to be located in the block B8. Likewise, because the object tracker TF2 spans across the block B6 and the block B9 and an area of the block B6 that is covered by the object tracker TF2 is greater than an area of the block B9 that is covered by the object tracker TF0, the object tracker TF2 is considered to be located in the block B6.

According to the above descriptions, the object detection and tracking method of this embodiment generates an auxiliary tracker for a block where the object tracker is located and records a relative position between the object tracker and the auxiliary tracker. The object detection and tracking method of this embodiment tracks not only the object tracker but also the auxiliary tracker, so more information (including the relative position between the object tracker and the auxiliary tracker) related to the object tracker can be provided during the tracking process to widen the range in which the object tracker can be searched in each frame.

Figure 2A:
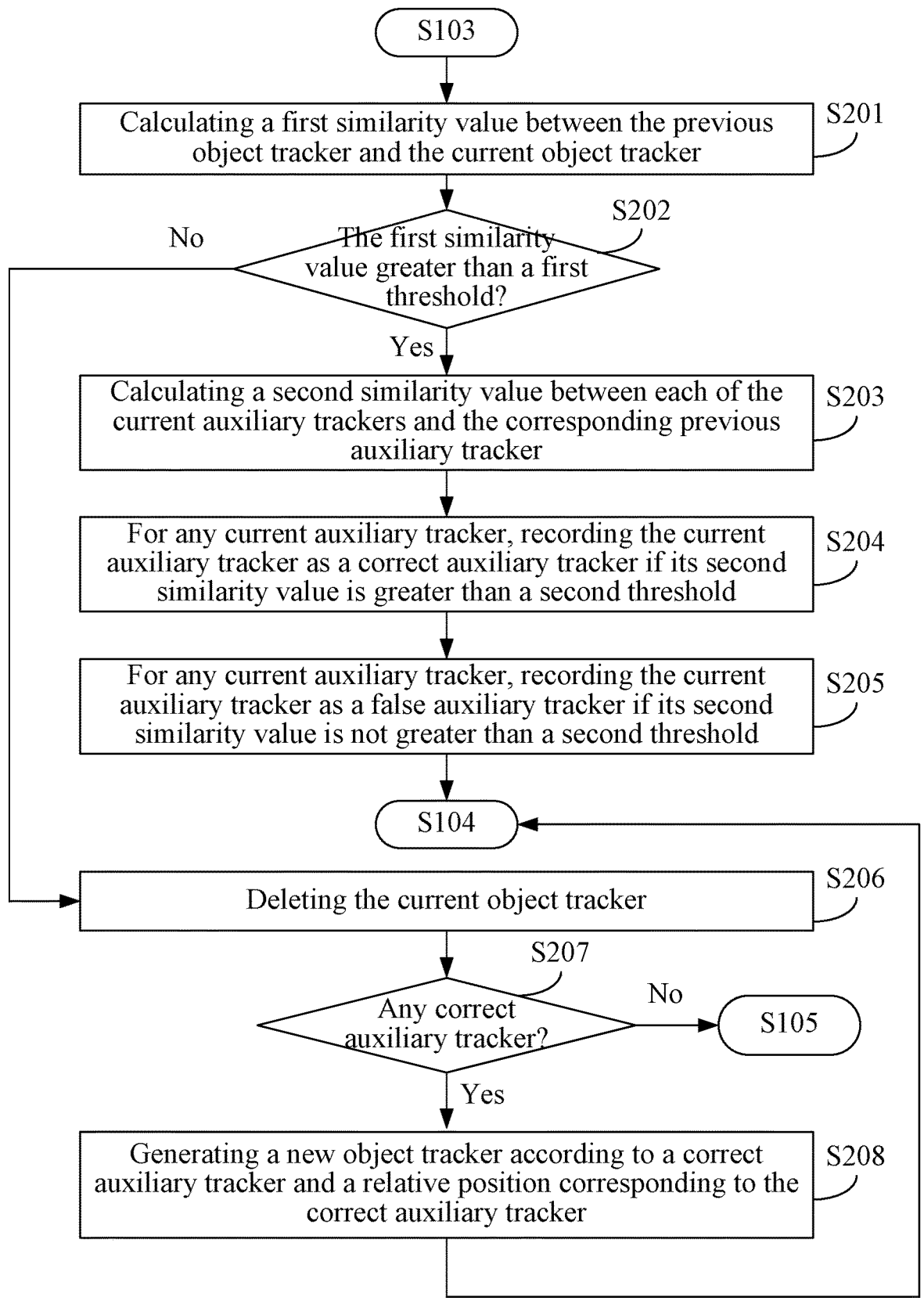
FIG. 2A depicts a partial flowchart diagram of a second embodiment.

A second embodiment of the present invention is another object detection and tracking method, and a partial flowchart diagram of which is depicted in FIG. 2A. The object detection and tracking method is adapted for an electronic computing apparatus. The object detection and tracking method can detect and track an object in a video. The second embodiment can also execute the steps described in the first embodiments, and have the same function and deliver the same effect as those of the first embodiment. Hereinbelow, only differences from the first embodiment will be detailed.

In this embodiment, the object detection and tracking method also executes the steps S101 to S103 first. Then, a similarity value between object trackers in two frames and a similarity value between auxiliary trackers in two frames are calculated to ensure accuracy of tracking the object tracker and the auxiliary trackers.

Differences of this embodiment from the first embodiment will be described by taking a case where the object T is tracked in the frame F0 and the frame F1 as an example. Specifically, a first similarity value between the previous object tracker TF0 and the current object tracker TF1 is calculated by the electronic computing apparatus in step S201. In step S202, the electronic computing apparatus determines whether the first similarity value is greater than a first threshold. If the determination result of the step S202 is "Yes", then step S203 is executed where the electronic computing apparatus calculates a second similarity value between each of the current auxiliary trackers and the corresponding previous auxiliary tracker (i.e., calculates a second similarity value between the current auxiliary tracker AF1 and the corresponding previous auxiliary tracker AF0) to ensure accuracy of the current auxiliary tracker AF1 that is tracked in the current frame F1. Next in step S204, if the second similarity value of any of the current auxiliary trackers is greater than a second threshold, the electronic computing apparatus records the current auxiliary tracker as a correct auxiliary tracker. Additionally in step S205, if the second similarity value of any of the current auxiliary trackers is not greater than the second threshold, the electronic computing apparatus records the current auxiliary tracker as a false auxiliary tracker. Then the step S104 can be executed following the step S205. It shall be appreciated that, the present invention has no limitation on the order in which the step S204 and the step S205 are executed. Furthermore, if the determination result in the step S202 is "Yes", the step S104 is executed directly in some embodiments.

Figure 2B:
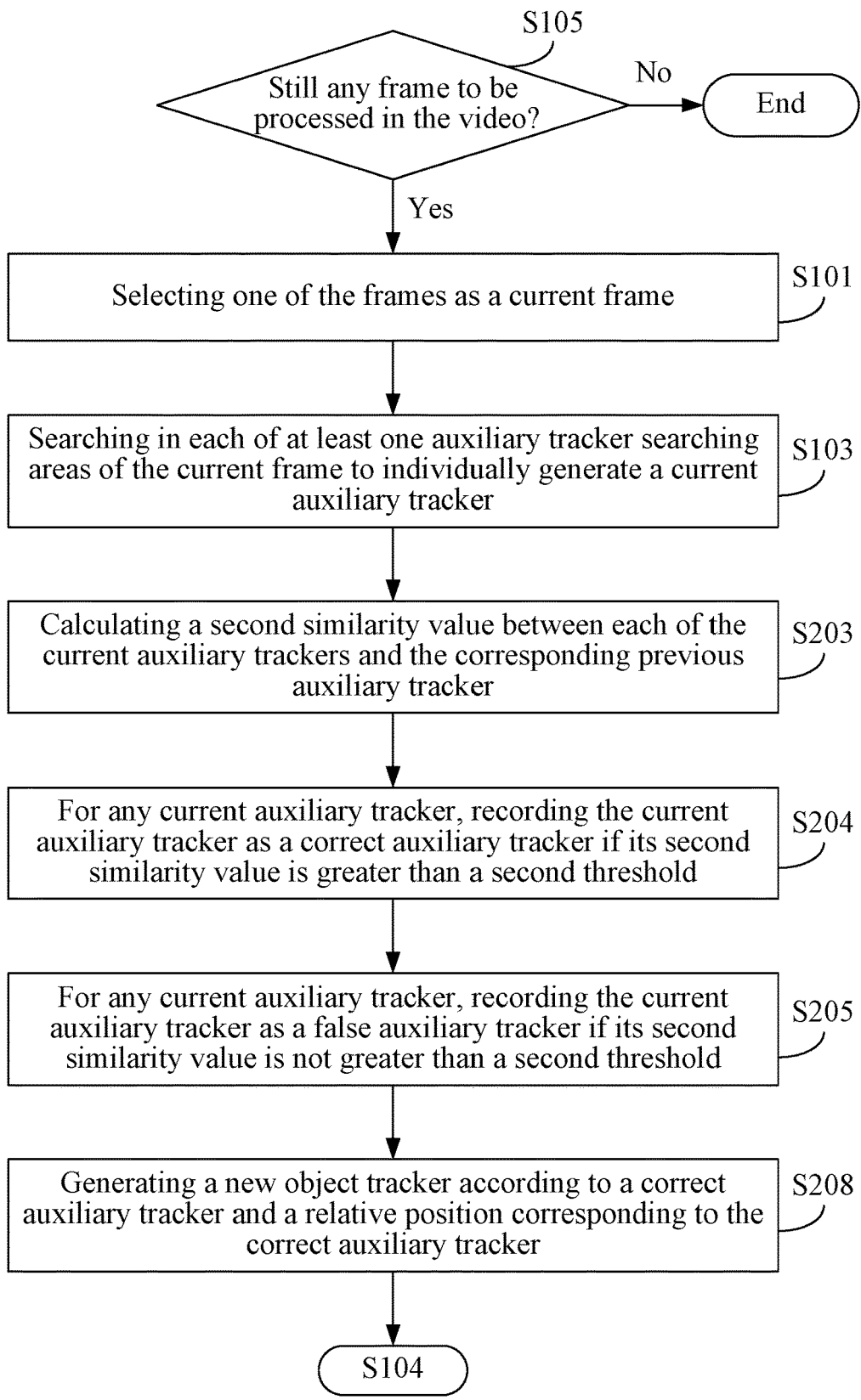
FIG. 2B depicts a partial flowchart diagram of the second embodiment.

If the determination result of the step S202 is "No", then the electronic computing apparatus deletes the current object tracker in step S206. Then in step S207, the electronic computing apparatus determines whether there is a correct auxiliary tracker. If the determination result in the step S207 is "Yes", step S208 is executed where the electronic computing apparatus generates a new object tracker according to a correct auxiliary tracker and a relative position corresponding to the correct auxiliary tracker, and then the step S104 is executed. If the determination result in the step S207 is "No", a process flow depicted in FIG. 2B will be executed. Specifically, the electronic computing apparatus determines whether there is still any frame to be processed in the step S105. If the determination result of the step S105 is "No", the object detection and tracking method is finished. Otherwise, if the determination result of the step S105 is "Yes", step S101 is executed where the electronic computing apparatus confirms a current frame (i.e., selects from the frames a next frame to be processed as the current frame). Because the previous frame of the current frame has no current object tracker and correct auxiliary tracker, the step S103 is then executed where the electronic computing apparatus searches in each of at least one auxiliary tracker searching area of the current tracker to individually generate a current auxiliary tracker. Then the electronic computing apparatus executes the steps S203 to S205 on the current frame. When a correct auxiliary tracker of the current frame is obtained in the step S204, step S208 is executed where the electronic computing apparatus generates a new object tracker according to the correct auxiliary tracker and a relative position corresponding to the correct auxiliary tracker. Afterwards, the step S104 is executed.

Herein, differences of this embodiment from the first embodiment will be described by taking a case where the object T is tracked in the frame T1 and the frame T2 as an example. Similarly, a first similarity value between the previous object tracker TF1 and the current object tracker TF2 is calculated in the step S201. If it is determined in the step S202 that the first similarity value is not greater than the first threshold, it means that the current object tracker TF2 tracked in the current frame F2 is false. Then in the step S206, the current object tracker TF2 is deleted. Next, if it is determined in the step S207 that there is a correct auxiliary tracker (e.g., the auxiliary tracker AF1), the step S208 is executed to generate a new object tracker according to the correct auxiliary tracker and a relative position corresponding to the correct auxiliary tracker, and then the step S104 is executed.

If it is determined in the step S202 that the first similarity value is greater than the first threshold, it means that the current object tracker TF2 tracked in the current frame F2 is correct. Then the step S203 is executed to calculate a second similarity between each of the current auxiliary tracker and the corresponding previous auxiliary tracker (i.e., calculates a second similarity value between the current auxiliary tracker AF3 and the corresponding previous auxiliary tracker AF2, and calculates a second similarity value between the current auxiliary tracker AF4 and the corresponding previous auxiliary tracker AF2) to ensure accuracy of the current auxiliary tracker AF3, AF4 tracked in the current frame F1. For any of the current auxiliary trackers, it is recorded as a correct auxiliary tracker if its second similarity value is greater than the second threshold. Additionally, for any of the current auxiliary trackers, it is recorded as a false auxiliary tracker if its second similarity value is not greater than the second threshold.

It shall be appreciated that, in this embodiment, the step S201 and the step S204 may employ normalized cross-correlation of histogram or principal component analysis to determine the similarity values, but they are not limited thereto. Additionally, the first threshold and the second threshold may be determined according to the object to be tracked and the selected tracking algorithm. For example, these thresholds may be preset by the user, and when the object to be tracked has a complex pattern or the selected tracking algorithm has a low resolution and tracking ability, the tracking quality may be improved by increasing these thresholds. For example, if the Kernelized Correlation Filter (KCF) algorithm is selected as the tracking algorithm to track a plurality of objects (e.g., one object is a label on a carton, and another object is a flat cable in a case) in a video and different frames of the video present different picture complexities (e.g., the current frame has a picture complexity higher than that of the previous frame), processing all the frames according to a same threshold will necessary make the accuracy of the tracking result of the current frame lower than that of the previous frame. In this case, the user may improve the tracking accuracy of the present invention by adjusting these thresholds.

As can be known from the second embodiment, the present invention not only provides more information related to the object tracker during the tracking process and solves the problem of the restricted tracking range of the tracking algorithm, but also improves the object tracking accuracy of the tracking algorithm by comparing similarity values.

The object detection and tracking methods described in the first embodiment and the second embodiment may each be implemented by a computer program product comprising a plurality of instructions. The computer program product may be stored in a non-transitory computer-readable storage medium. For each of the computer program product, when the instructions comprised therein are loaded into an electronic computing apparatus (e.g., the object detection and tracking system 300 of the third embodiment), the instructions execute the object detection and tracking methods described in the first embodiment and the second embodiment respectively. The non-transitory computer-readable storage medium may be an electronic product, e.g., a read only memory (ROM), a flash memory, a floppy disk, a hard disk, a compact disk (CD), a mobile disk, a magnetic tape, a recording element accessible to networks, or any other storage media with the same functionality and well known to those skilled in the art.

Figure 3:
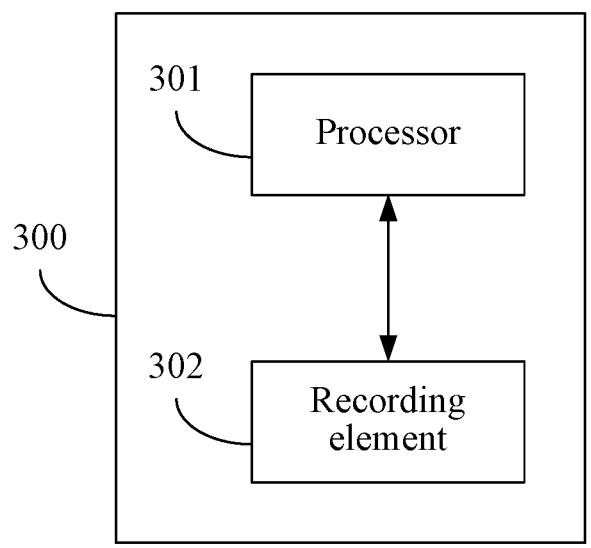
FIG. 3 depicts a schematic architectural view of an object detection and tracking system of a third embodiment and a fourth embodiment.

A third embodiment of the present invention is an object detection and tracking system 300, a schematic architectural view of which is depicted in FIG. 3. The object detection and tracking system 300 comprises a processor 301 and a recording element 302 electrically connected to the processor 301. The recording element 302 stores various data generated by the processor 301, including object trackers (e.g., coordinates of object trackers), auxiliary trackers (e.g., coordinates of auxiliary trackers), relative positions, and etc. The processor 301 may be any of various processors, central processing units (CPUs), microprocessors, control elements, other hardware elements that can execute instructions or other computing devices known to those of ordinary skill in the art. The recording element 302 may be a memory, a Universal Serial Bus (USB), a hard disk, a compact disk (CD), a mobile disk or any other storage medium or circuit known to those of ordinary skill in the art and having the same functionality.

The object detection and tracking system 300 can detect and track an object in a video. In this embodiment, the video comprises a plurality of frames having a time sequence, the frames have a same coordinate range, and the coordinate range is defined into a plurality of blocks. Specifically, the processor 301 of the object detection and tracking system 300 executes the following steps (a) to (e). First, in step (a), selecting one of the frames as a current frame, wherein a previous frame of the current frame has a previous object tracker and at least one previous auxiliary tracker, each of the at least one previous auxiliary tracker individually has a first relative position relative to a generated object tracker, the previous object tracker is located in one of the blocks and is one of the at least one generated object tracker, and each of the at least one generated object tracker is located in one of the blocks.

Step (b): searching in an object tracker searching area of the current frame to generate a current object tracker, wherein the object tracker searching area is defined by the previous object tracker, and the current object tracker is located in one of the blocks.

Step (c): searching in each of at least one auxiliary tracker searching area of the current frame to individually generate a current auxiliary tracker, wherein each of the at least one auxiliary tracker searching area is defined by one of the at least one previous auxiliary tracker.

Step (d): when the block where the current object tracker is located is different from the blocks where each of the at least one generated object tracker is located, generating a new auxiliary tracker at a central position of the current frame, the current object tracker having a second relative position relative to the new auxiliary tracker.

Step (e): repeating the steps (a) to (d) by taking the current frame as the previous frame, the current object tracker as the previous object tracker, and the at least one current auxiliary tracker and the new auxiliary tracker as the at least one previous auxiliary tracker or repeating the steps (a) to (e) until all frames in the video have been processed.

The recording element 302 stores the previous object tracker, the at least one previous auxiliary tracker, the current object tracker, the at least one current auxiliary tracker, the new auxiliary tracker, the at least one first relative position and the second relative position. Specifically, data of the various trackers described above may be tracker coordinates, tracker sizes or image data within the trackers, and so on.

In addition to the aforesaid steps, the third embodiment can also execute all the operations and steps described in the first embodiment, and have the same functions and deliver the same effects as the first embodiment. How the third embodiment executes these operations and steps and has the same functions and delivers the same effect can be readily understood by those of ordinary skill in the art from the above description of the first embodiment, so it will not be further described herein.

Please refer still to FIG. 3, which is also a block diagram of an object detection and tracking system according to a fourth embodiment of the present invention. In this embodiment, the object detection and tracking system 300 can also execute the steps described in the third embodiment, and have the same function and deliver the same effect as the third embodiment, so the following description focuses only on differences of this embodiment from the third embodiment.

In the fourth embodiment, the processor 301 further calculates a first similarity value between the previous object tracker and the current object tracker and determines whether the first similarity value is greater than the first threshold after the step (c). Only when the first similarity value is greater than the first threshold, will the processor 301 executes the step (d) and executes the following steps on each of the at least one current auxiliary tracker: (i) calculating a second similarity value between the current auxiliary tracker and the corresponding previous auxiliary tracker; (ii) recording in the recording element 302 the current auxiliary tracker as a correct auxiliary tracker if the second similarity value is greater than a second threshold; and (iii) recording in the recording element 302 the current auxiliary tracker as a false auxiliary tracker if the second similarity value is not greater than the second threshold.

On the other hand, if the processor 301 determines that the first similarity value is not greater than the first threshold, the processor 301 deletes the current object tracker. Additionally, the processor 301 confirms whether the recording element 302 has recorded a correct auxiliary tracker. If the recording element 302 has recorded a correct auxiliary tracker therein, the processor 301 generates a new object tracker according to the correct auxiliary tracker and a relative position corresponding to the correct auxiliary tracker before executing the step (d). If the recording element 302 has not recorded a correct auxiliary tracker therein, the processor 301 executes the step (e) directly.

In addition to the aforesaid steps, the fourth embodiment can also execute all the operations and steps described in the second embodiment, and have the same functions and deliver the same effects as the second embodiment. How the fourth embodiment executes these operations and steps and has the same functions and delivers the same effect can be readily understood by those of ordinary skill in the art from the above description of the second embodiment, so it will not be further described herein.

It shall be appreciated that, in the specification of the present invention, the words "first" or "second" used preceding pronouns are only intended to indicate that these pronouns are different from each other. For example, the words "first" and "second" used in the first similarity value and the second similarity value are only intended to indicate that these similarity values are different from each other. Additionally, the words "previous", "current" or "new" used preceding pronouns are only intended to indicate that these pronouns are different from each other. For example, in the specification of the present invention, the words "previous", "current" and "new" used in the previous auxiliary tracker, the current auxiliary tracker and the new auxiliary tracker are only intended to indicate that these auxiliary trackers are different from each other.

According to the above description, by using at least one auxiliary tracker generated in each frame and a recorded relative position between each of the at least one auxiliary tracker and a corresponding generated object tracker and by designing the size of each of the at least one auxiliary tracker to be at least a half of the size of each frame, the object detection and tracking technology (including the object detection and tracking method and system) of the present invention solves the problem that the tracking algorithm may fail to accomplish the tracking due to the restricted specific searching range. Then when an object goes beyond the specific searching range of the tracking algorithm, the object detection and tracking technology of the present invention can obtain the position of the object tracker according to the at least one relative position described above.

The object detection and tracking technology of the present invention defines a coordinate range of the frames included in a video into a plurality of blocks. The object detection and tracking technology of the present invention determines whether to generate a new auxiliary tracker according to generation records of auxiliary trackers of each block recorded in the recording element. Specifically, if no auxiliary tracker has been generated for a block where the current object tracker is located, then the technology of the present invention generates a new auxiliary tracker at a central position of the frame and records the current object tracker, the new auxiliary tracker and a relative position therebetween as a reference for use when the object tracker is lost in the subsequent image tracking process. The object detection and tracking technology of the present invention generates a corresponding new auxiliary tracker only when the current tracker is generated the first time in a block, so waste of computing resources caused by repeatedly generating auxiliary trackers for a same block can be avoided.

Furthermore, the object detection and tracking technology of the present invention tracks an object tracker and all auxiliary trackers with a tracking algorithm, calculates a similarity value between object trackers in two frames to ensure accuracy of the current object tracker tracked in the current frame, and calculates a similarity value between corresponding auxiliary trackers in two frames to ensure accuracy of the auxiliary tracker tracked in the current frame. The object detection and tracking technology of the present invention records correct auxiliary trackers as a reference for use when the object tracker is lost in the subsequent image tracking process, and solves the problem that the tracking algorithm might fail to distinguish between similar objects. Thereby, the present invention provides a tracking technology that can search in a large range and identify objects in a video to optimize the tracking result in low-performance requirement environments.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An object detection and tracking method adapted for an electronic computing apparatus, a video comprising a plurality of frames, the frames having a same coordinate range, and the coordinate range being defined into a plurality of blocks, the object detection and tracking method comprising:
   (a) selecting one of the frames as a current frame, wherein a previous frame of the current frame has a previous object tracker and at least one previous auxiliary tracker, each of the at least one previous auxiliary tracker individually has a first relative position relative to a generated object tracker, the previous object tracker is located in one of the blocks and is one of the at least one generated object tracker, and each of the at least one generated object tracker is located in one of the blocks;
   (b) searching in an object tracker searching area of the current frame to generate a current object tracker, wherein the object tracker searching area is defined by the previous object tracker, and the current object tracker is located in one of the blocks;
   (c) searching in each of at least one auxiliary tracker searching area of the current frame to individually generate a current auxiliary tracker, wherein each of the at least one auxiliary tracker searching area is defined by one of the at least one previous auxiliary tracker;
   (d) when the block where the current object tracker is located is different from the blocks where each of the at least one generated object tracker is located, generating a new auxiliary tracker at a central position of the current frame, the current object tracker having a second relative position relative to the new auxiliary tracker;
   (e) repeating the steps (a) to (d) by taking the current frame as the previous frame, the current object tracker as the previous object tracker, and the at least one current auxiliary tracker and the new auxiliary tracker as the at least one previous auxiliary tracker;
   (f) calculating a first similarity value between the previous object tracker and the current object tracker; and
   (g) performing the following steps when the first similarity value is less than a first threshold:
      (g1) deleting the current object tracker; and
      (g2) generating a new object tracker according to a correct auxiliary tracker and a relative position to which the correct auxiliary tracker corresponds.

2. The object detection and tracking method of claim 1, wherein the step (d) is performed when the first similarity value is greater than the first threshold.

3. The object detection and tracking method of claim 2, further executing the following steps on each of the at least one current auxiliary tracker when the first similarity value is greater than the first threshold:
   calculating a second similarity value between the current auxiliary tracker and the corresponding previous auxiliary tracker;
   recording the current auxiliary tracker as a correct auxiliary tracker if the second similarity value is greater than a second threshold; and
   recording the current auxiliary tracker as a false auxiliary tracker if the second similarity value is not greater than the second threshold.

4. The object detection and tracking method of claim 1, wherein a size of the previous auxiliary tracker is at least a half of a size of the previous frame, and a size of the new auxiliary tracker is at least a half of a size of the current frame.

5. The object detection and tracking method of claim 1, wherein when the current object tracker spans across more than one of the blocks, a block having the largest area covered by the current object tracker is taken as the block where the current object tracker is located, and when the previous object tracker spans across more than one of the blocks, a block having the largest area covered by the previous object tracker is taken as the block where the previous object tracker is located.

6. An object detection and tracking system, a video comprising a plurality of frames, the frames having a same coordinate range, the coordinate range being defined into a plurality of blocks, and the object detection and tracking system comprising:
   a recording element; and
   a processor, being electrically connected to the recording element,
   wherein the processor, in an operation (a), selects one of the frames as a current frame, wherein a previous frame of the current frame has a previous object tracker and at least one previous auxiliary tracker, each of the at least one previous auxiliary tracker individually has a first relative position relative to a generated object tracker, the previous object tracker is located in one of the blocks and is one of the at least one generated object tracker, and each of the at least one generated object tracker is located in one of the blocks, wherein the processor, in an operation (b), searches
in an object tracker searching area of the current frame to generate a current object tracker, wherein the object tracker searching area is defined by the previous object tracker, and the current object tracker is located in one of the blocks,
wherein the processor, in an operation (c), searches
in each of at least one auxiliary tracker searching area of the current frame to individually generate a current auxiliary tracker, wherein each of the at least one auxiliary tracker searching area is defined by one of the at least one previous auxiliary tracker,
wherein when the block where the current object tracker is located is different from the blocks where each of the at least one generated object tracker is located, the processor, in an operation (d), generates a new auxiliary tracker at a central position of the current frame, wherein the current object tracker has a second relative position relative to the new auxiliary tracker
wherein the processor, in an operation (e), repeats the operations (a) to (d)
by taking the current frame as the previous frame, the current object tracker as the previous object tracker, and the at least one current auxiliary tracker and the new auxiliary tracker as the at least one previous auxiliary tracker, and
wherein the recording element stores the previous object tracker, the at least one previous auxiliary tracker, the current object tracker, the at least one current auxiliary tracker, the new auxiliary tracker, the at least one first relative position and the second relative position
wherein the processor further calculates a first similarity value between the previous object tracker and the current object tracker,
wherein when the first similarity value is less than a first threshold, the processor further deletes the current object tracker and generates a new object tracker according to a correct auxiliary tracker and a relative position to which the correct auxiliary tracker corresponds.

7. The object detection and tracking system of claim 6, wherein the processor generates the new auxiliary tracker at the central position of the current frame when the first similarity value is greater than the first threshold.

8. The object detection and tracking system of claim 7, wherein when the first similarity value is greater than the first threshold, for each of the at least one current auxiliary tracker, the processor further calculates
a second similarity value between the current auxiliary tracker and the corresponding previous auxiliary tracker, records
in the recording element the current auxiliary tracker as a correct auxiliary tracker if the second similarity value is greater than a second threshold, and records
in the recording element the current auxiliary tracker as a false auxiliary tracker if the second similarity value is not greater than the second threshold.

9. The object detection and tracking system of claim 6, wherein a size of the previous auxiliary tracker is at least a half of a size of the previous frame, and a size of the new auxiliary tracker is at least a half of a size of the current frame.

10. The object detection and tracking system of claim 6, wherein when the current object tracker spans across more than one of the blocks, a block having the largest area covered by the current object tracker is taken as the block where the current object tracker is located, and when the previous object tracker spans across more than one of the blocks, a block having the largest area covered by the previous object tracker is taken as the block where the previous object tracker is located.

* * * * *